(12) United States Patent
Park

(10) Patent No.: US 10,522,874 B2
(45) Date of Patent: Dec. 31, 2019

(54) SOLID STATE FIBER-BASED BATTERY SYSTEM AND METHOD OF FORMING SAME

(71) Applicant: The Boeing Company, Chicago, IL (US)

(72) Inventor: Daniel Park, Wentzville, MO (US)

(73) Assignee: THE BOEING COMPANY, Chicago, IL (US)

( * ) Notice: Subject to any disclaimer, the term of this patent is extended or adjusted under 35 U.S.C. 154(b) by 267 days.

(21) Appl. No.: 15/340,480

(22) Filed: Nov. 1, 2016

(65) Prior Publication Data

US 2018/0123165 A1 May 3, 2018

(51) Int. Cl.
*H01M 10/058* (2010.01)
*H01M 10/02* (2006.01)
(Continued)

(52) U.S. Cl.
CPC ........... *H01M 10/058* (2013.01); *B64C 3/185* (2013.01); *B64C 3/26* (2013.01); *B64D 27/24* (2013.01); *H01M 2/105* (2013.01); *H01M 2/202* (2013.01); *H01M 4/04* (2013.01); *H01M 10/02* (2013.01); *H01M 10/0422* (2013.01); *H01M 10/054* (2013.01); *H01M 10/0525* (2013.01); *H01M 10/0562* (2013.01); *B64C 2001/0072* (2013.01);
(Continued)

(58) Field of Classification Search
USPC .......................................................... 429/94
See application file for complete search history.

(56) References Cited

U.S. PATENT DOCUMENTS

| 4,645,726 A | 2/1987 | Hiratani et al. |
| 5,187,033 A | 2/1993 | Koshiba |

(Continued)

FOREIGN PATENT DOCUMENTS

| KR | 20170078461 A | 7/2017 |
| WO | 03022564 A1 | 3/2003 |

(Continued)

OTHER PUBLICATIONS

Cuthbertson, A., NASA explores the idea of electric plane that uses fuselage structure as battery, International Business Times, Jun. 23, 2015.

(Continued)

*Primary Examiner* — Maria Laios
(74) *Attorney, Agent, or Firm* — Moore IP Law

(57) ABSTRACT

A solid state battery system and methods of forming a solid state battery system. The solid state battery system has a plurality of fiber battery cells formed into a pattern. Each fiber battery cell has a fiber inner core which may be a carbon-graphite, carbon-nanotube, boron-nanotube or boron-nitride-nanotube fiber and serves as the anode. In addition, the fiber battery cell has an electrolyte layer formed over the fiber inner core and an outer conductive layer (the cathode) formed over the electrolyte layer. A first terminal is electrically coupled to the fiber inner core of each of the plurality of fiber battery cells. A second terminal is electrically coupled to the outer conductive layer of each of the plurality of fiber battery cells. The solid state battery system may be incorporated into a composite part for a vehicle, such as an aircraft.

18 Claims, 3 Drawing Sheets

(51) Int. Cl.

| | |
|---|---|
| *H01M 10/04* | (2006.01) |
| *H01M 10/0525* | (2010.01) |
| *H01M 10/054* | (2010.01) |
| *H01M 10/0562* | (2010.01) |
| *H01M 2/10* | (2006.01) |
| *H01M 2/20* | (2006.01) |
| *H01M 4/04* | (2006.01) |
| *H01M 4/02* | (2006.01) |
| *B64C 3/18* | (2006.01) |
| *B64C 3/26* | (2006.01) |
| *B64D 27/24* | (2006.01) |
| *B61C 1/00* | (2006.01) |
| *B64C 1/00* | (2006.01) |

(52) U.S. Cl.
CPC ...... *H01M 2004/022* (2013.01); *H01M 2004/025* (2013.01); *H01M 2220/20* (2013.01); *H01M 2300/0071* (2013.01); *Y02E 60/122* (2013.01); *Y02T 10/7011* (2013.01)

(56) References Cited

U.S. PATENT DOCUMENTS

| | | | |
|---|---|---|---|
| 5,283,136 A | 2/1994 | Peled et al. | |
| 5,989,300 A | 11/1999 | Eshraghi | |
| 9,419,208 B2 | 8/2016 | Sano | |
| 2005/0271796 A1 | 12/2005 | Benson | |
| 2010/0330419 A1* | 12/2010 | Cui | H01M 4/04 |
| | | | 429/209 |
| 2012/0308887 A1* | 12/2012 | Hucker | H01M 2/1606 |
| | | | 429/211 |
| 2014/0170493 A1* | 6/2014 | Holme | H01M 4/04 |
| | | | 429/220 |
| 2015/0064603 A1* | 3/2015 | Smithyman | G01N 27/223 |
| | | | 429/492 |
| 2016/0293993 A1* | 10/2016 | Keates | H01M 10/0431 |

FOREIGN PATENT DOCUMENTS

| | | |
|---|---|---|
| WO | 2010120816 A2 | 10/2010 |
| WO | 2013050284 A1 | 4/2013 |
| WO | 2016160247 A1 | 10/2016 |

OTHER PUBLICATIONS

Zhang, Y., et al., Three-dimensional carbon fiber as current collector for lithium/sulfur batteries, (abstract only), Springer, Ionics, vol. 20, Issue 6, pp. 803-808, Jun. 2014.

Inman, D., et al., Genomics of Multifunctional Structures and Materials for Flight, 54th AIAA/ASME/ASCE/AHS/ASC Structures, Structural Dynamics, and Materials Conference, Apr. 8-11, 2013, Boston, Massachusetts.

Tatsumisago, M., Solid-State Lithium Batteries Using Glass Electrolytes, International Workshop on Scientific Challenges on New Functionalities in Glass Apr. 15-17, 2007.

Weng, W., et al., Winding Aligned Carbon Nanotube Composite Yarns into Coaxial Fiber Full Batteries with High Performances, American Chemical Society, NANO Letters, published May 15, 2014.

UK Combined Search and Examination Report dated Apr. 23, 2018.
UK Examination Report for Application No. GB1717495.4 dated Jan. 15, 2019, 5 pgs.
UK Examination Report for GB1717495.4 dated Apr. 12, 2019, 4 pgs.

\* cited by examiner

SOLID STATE FIBER-BASED BATTERY SYSTEM AND METHOD OF FORMING SAME

FIELD

This disclosure relates to solid state fiber-based battery systems and to methods of forming such solid state fiber-based battery systems, and more particularly to a solid state fiber-based battery system that may be incorporated into the structure of an underlying vehicle such as an aircraft.

BACKGROUND

A constant issue in the design of an electric motor-powered aircraft is addressing the relatively low power-to-weight ratio that results from the heavy batteries required to operate the electric motor for the duration of the flight. Conventional batteries, e.g., lithium batteries, are heavy and relatively low in energy/power density relative to fossil fuels. Other energy storage technologies which may be capable of increasing the resultant power-to-weight ratio are being studied but are not yet mature enough for practical implementation.

Some attempts have been made to form aircraft structures that include integral batteries. However such structures typically add an inner layer including a conventional battery having, for example, a planar structure between outer supportive layers, which adds weight and reduces the structural integrity of such structure.

Accordingly, there is a need for an energy storage system which overcomes the problems recited above.

SUMMARY

In one aspect, a solid state battery system includes a plurality of fiber battery cells formed into a pattern. Each fiber battery cell has a fiber inner core, an electrolyte layer formed over the fiber inner core, and an outer conductive layer formed over the electrolyte layer. Further, a first terminal is electrically coupled to the fiber inner core of each of the plurality of fiber battery cells. Finally, a second terminal is electrically coupled to the outer conductive layer of each of the plurality of fiber battery cells.

In a further embodiment, the fiber inner core may be formed from a carbon-graphite fiber, a carbon-nanotube fiber, a boron-nanotube fiber, or a boron-nitride-nanotube fiber. The electrolyte layer may be formed from solid electrolyte. The solid electrolyte may be a glassy material such as a lithium ion conducting material or a crystalline material such as boron-Alumina. The outer conductive layer may be formed from a magnesium intercalation compound, a lithium intercalation compound or a Group 1 or 2 metal. In one further embodiment, the plurality of fiber battery cells may be formed into a planar configuration having at least one row of fiber battery cells. In an alternative further embodiment, the plurality of fiber battery cells are formed into a mesh or weave pattern.

The solid state battery system may be incorporated into a composite part for a vehicle, such as a fiber wing skin for an aircraft or a fiber spar for an aircraft.

In a second aspect, a method of forming a solid state battery is described. An electrolyte layer is formed over a fiber core. An outer conductive layer is formed over the electrolyte layer to form a fiber battery cell. A plurality of fiber battery cells are formed into a pattern. A first terminal is electrically coupled to the fiber core of each of the fiber battery cells. Finally, a second terminal is electrically coupled to the outer conductive layer of each of the fiber battery cells. In a further embodiment, an electrical and/or magnetic field is applied to the electrolyte layer during a curing period after the formation thereof.

In a third aspect, a method of forming a solid state battery is described. An electrolyte layer is formed over a fiber core to form a partial fiber battery cell. A plurality of partial fiber battery cells are formed into a pattern. A first terminal is electrically coupled to the fiber core of each of the fiber battery cells. Finally, an outer conductive layer is formed over the electrolyte layer of each of the partial fiber battery cells. In a further embodiment, an electrical and/or magnetic field is applied to the electrolyte layer during a curing period after the formation thereof.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Carbon-graphite fibers, carbon-nanotube fibers, boron-nanotube fibers, and boron-nitride-nanotube fibers and structures formed therefrom have a high stiffness, high tensile strength, low weight, high chemical resistance, high temperature tolerance and low thermal expansion. This makes composite structures formed from carbon-graphite fibers, carbon-nanotube fibers, boron-nanotube fibers, and boron-nitride-nanotube fibers popular for use in aerospace, civil engineering, military, and motorsport applications.

The present disclosure describes a solid state battery system formed from a plurality of fiber battery cells having a coaxial structure including an inner fiber core that acts as the battery anode, a solid electrolyte layer formed over the inner carbon core, and an outer conductive layer that is formed over the solid electrolyte layer and acts as the battery cathode. By forming a composite fiber structure, at least in part, from a plurality of such fiber battery cells (e.g., in parallel or in a woven pattern), the resultant structure will have all the benefits recited above of a composite structure (since the core of each fiber battery cell is a carbon or boron fiber) and will also act as an energy storage device (battery).

This is quite different from a structure formed in layers, with a conventional battery inserted in an inner layer thereof, because the solid state battery system of the present disclosure contributes to the structural integrity of the resultant structure, instead of adding weight and reducing the structural integrity thereof as would occur when a conventional battery is incorporated into an inner layer of a layered structure. It is particularly important to ensure that the structural integrity of the part is maintained when the resultant structure is a composite part for an aircraft, e.g., a wing skin or spar. In addition, the coaxial structure of each fiber battery cell provides a significantly higher surface area than a planar structure, and a structural part including a battery formed from coaxial fiber battery cells will have a much higher energy storage capability than a structural part including an integral internal planar battery.

Figure 1A:
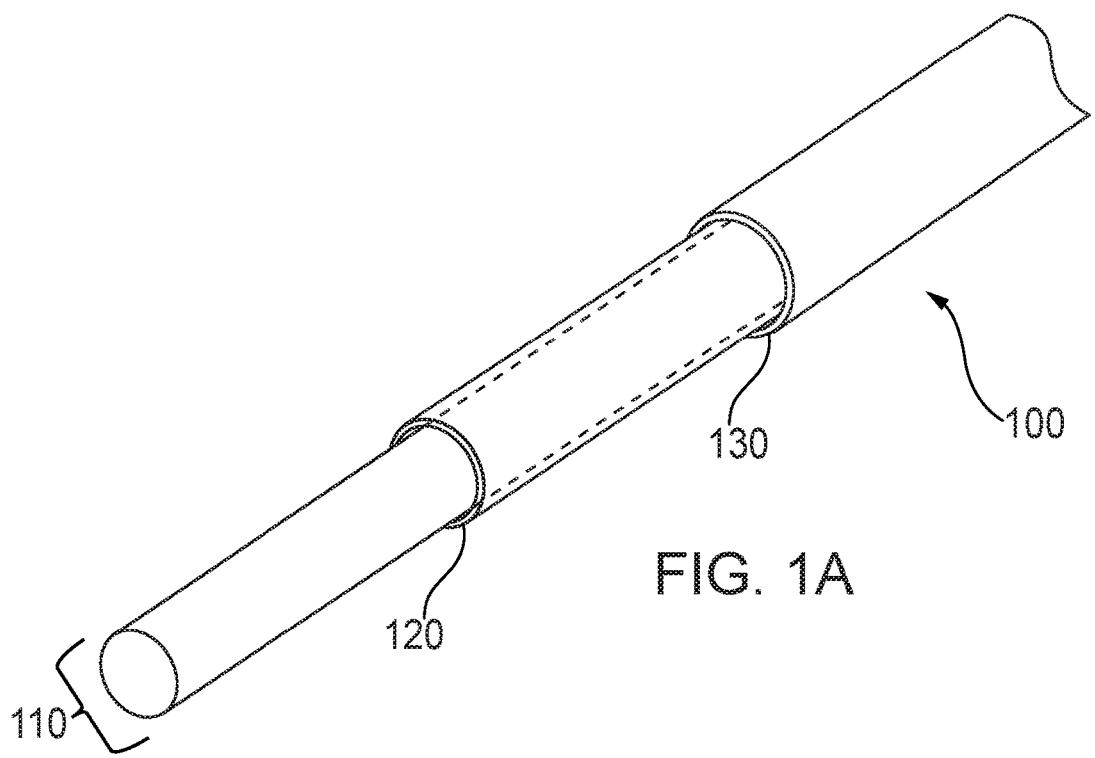
FIG. 1A is a perspective side view of a solid state fiber battery cell for use in a battery system according to an embodiment of the present disclosure.
Figure 1B:
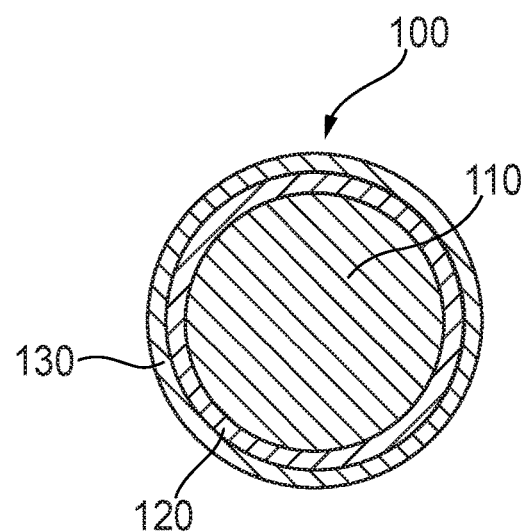
FIG. 1B is a diagram of a cross-sectional view thereof.

Referring now to FIGS. 1A and 1B, a fiber battery cell 100 includes a fiber core 110, an electrolyte layer 120, and an outer conductive layer 130. The inner fiber core 110 acts as an anode for the battery cell 100 and may consist of a carbon-graphite fiber, a carbon-nanotube fiber, a boron-nanotube fiber, or a boron-nitride-nanotube fiber. The electrolyte layer 120 acts as the electrolyte for the battery cell 100 and is a solid electrolyte (i.e., a fast ion conductor). For example, electrolyte layer 120 may be a glassy solid electrolyte such as a lithium ion conducting glassy material or a crystalline solid electrolyte such as beta-Alumina. Other types of solid electrolytes may also be used. The outer conductive layer 130 acts as the cathode for the battery cell 100 and may be a magnesium or lithium intercalation compound or a Group 1 or 2 metal. Alternatively, outer conductive layer 130 may be a magnesium or lithium intercalation compound or a Group 1 or 2 metal mixed with a matrix material such as an epoxy resin, glass or a thermoplastic polymer. The battery cell 100 includes outer conductive layer 130 (the cathode) over the electrolyte layer 120 that in turn is over the conductive fiber core 110 (the anode) and thus forms a battery cell structure that allows electrical energy to be stored therein.

Figure 2:
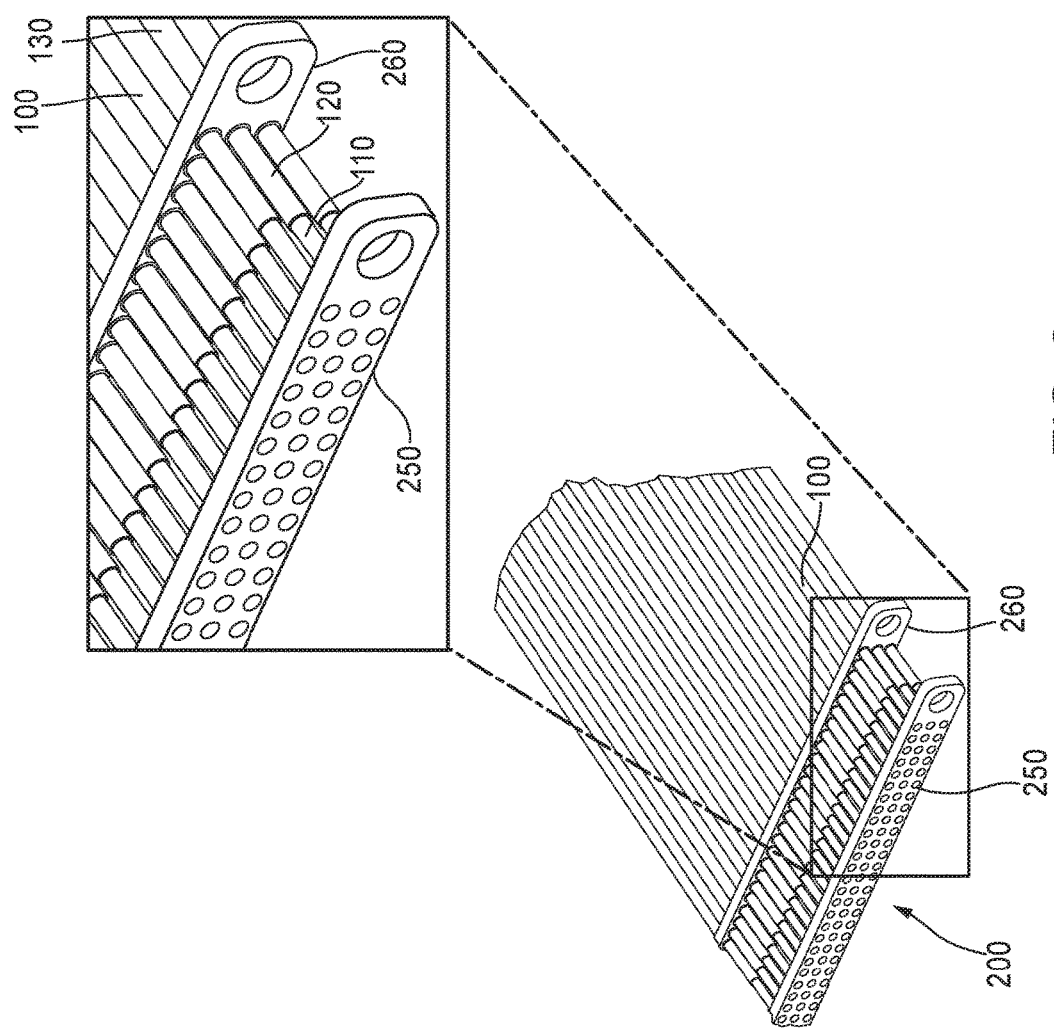
FIG. 2 is a diagram of a linear array of solid state fiber battery cells for use in a battery system according to an embodiment of the present disclosure.

Referring now to FIG. 2, a solid state battery system 200 of a plurality of battery cells 100 formed into a pattern. In particular, battery cells 100 are shown formed into a generally planar linear configuration that may be incorporated into a structural part, e.g., an aircraft wing or spar. Planar array 200 includes three rows of battery cells 100, but the number of rows is arbitrary and can be selected based on the particular application. The number of columns shown is merely exemplary and the actual number depends on the particular application. In addition, the battery cells 100 are shown aligned side-by-side in FIG. 2. In other embodiments, battery cells 100 may be arranged in alternative patterns, e.g., bundled to form a desired shape, arranged in a mesh or weave pattern that forms a flexible fabric, or braided to form a cylindrical tube or sheath. In particular, an arrangement of battery cells 100 may be formed into bundles of almost any size or shape, providing an advantage over conventional batteries. Planar array 200 includes a first conductive terminal 250 that is electrically coupled to the fiber core 110 (i.e., the battery cell anode) of each of the battery cells 100 and a second conductive terminal 260 that is electrically coupled to the outer conductive layer 130 (i.e., the battery cell cathode) of each of the battery cells 100. First conductive terminal 250, coupled to the anode of each battery cell 100, acts as the negative terminal of the solid state battery system 200, and second conductive terminal 260, coupled to the cathode of each battery cell 100, acts as the positive terminal of the solid state battery system 200. When incorporated into a structure formed from layers of carbon or boron fibers, solid state battery system 200 provides an energy storage system that maintains all the qualities of that structure, e.g., high stiffness, high tensile strength and low weight because each battery cell 100 includes a fiber inner core 110 which also includes such qualities.

Figure 3:
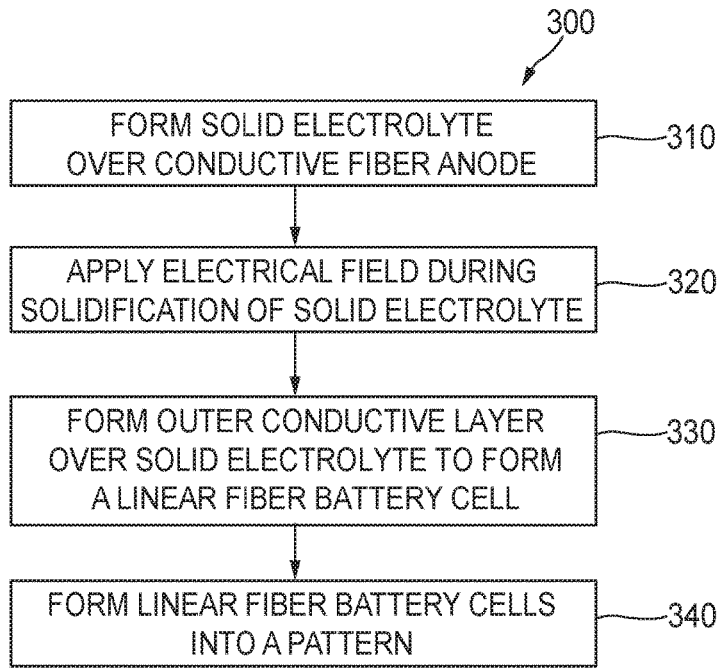
FIG. 3 is a flowchart of a method of forming a solid state fiber battery cell system for use in a battery system according to one embodiment of the present disclosure.

Referring now to FIG. 3, a flowchart 300 is shown describing the formation of a solid state battery system according to a first method. First, at step 310, a solid electrolyte is formed over a conductive fiber anode of predetermined length appropriate for the desired application. As discussed above, the conductive fiber anode may be a carbon-graphite fiber, a carbon-nanotube fiber, a boron-nanotube fiber or a boron-nitride-nanotube fiber. The solid electrolyte may be a glassy solid electrolyte or a crystalline solid electrolyte. The electrolyte layer may be formed on the conductive fiber anode by heating the glassy solid electrolyte to a drawing temperature thereof and then drawing the conductive fiber anode through the heated glassy solid electrolyte. One of ordinary skill in the art will readily recognize that there are other ways to form the electrolyte layer over the conductive fiber anode. Next, at optional step 320, an electrical and/or magnetic field is applied during the solidification (curing) of the electrolyte layer. This will align the intercalation sites in the electrolyte layer and reduce the ion mean free path between the anode and cathode, thereby improving the performance of the fiber battery cell by reducing the internal resistance thereof. At step 330, the outer conductive layer is formed over the solid electrolyte. As discussed above, the outer conductive layer may be a magnesium or lithium intercalation compound or a Group 1 or 2 metal. In this case, the outer conductive layer may be formed over the solid electrolyte in any conventional manner, e.g., by sputtering, electroplating, drawing, forming, etc. Alternatively, outer conductive layer 130 may be a magnesium or lithium intercalation compound or a Group 1 or 2 metal mixed with a matrix material such as an epoxy resin, glass or a thermoplastic polymer. Here, the outer conductive layer may be also be formed over the solid electrolyte in a conventional manner, e.g., casting, sintering, vacuum resin infusion, integration into prepreg resin, etc. After the completion of step 330, a fiber battery cell 100 as shown in FIG. 1 is achieved. Finally, at step 340, a plurality of fiber battery cells (such as the fiber battery cells 100 in FIG. 1) are formed into a pattern that may, for example, form a portion of a structural element. In particular, in this step, a plurality of fiber battery cells 100 may be formed into a solid state battery system (like the solid state battery system 200 shown in FIG. 2) appropriate for inclusion into a desired structural part. This requires adhering the plurality of fiber battery cells 100 into an appropriate pattern (e.g., a linear pattern with the fiber battery cells laid out side-by-side and stacked in layers as shown in FIG. 2) and coupling a positive terminal to the cathode of each of the fiber battery cells 100 and a negative terminal to the anode of each of the fiber battery cells 100. Once the solid state battery system is completed, it can then be incorporated into the desired structural part during the production thereof, with the terminals exposed for connection to external circuitry for charging and use of the solid state battery system.

Figure 4:
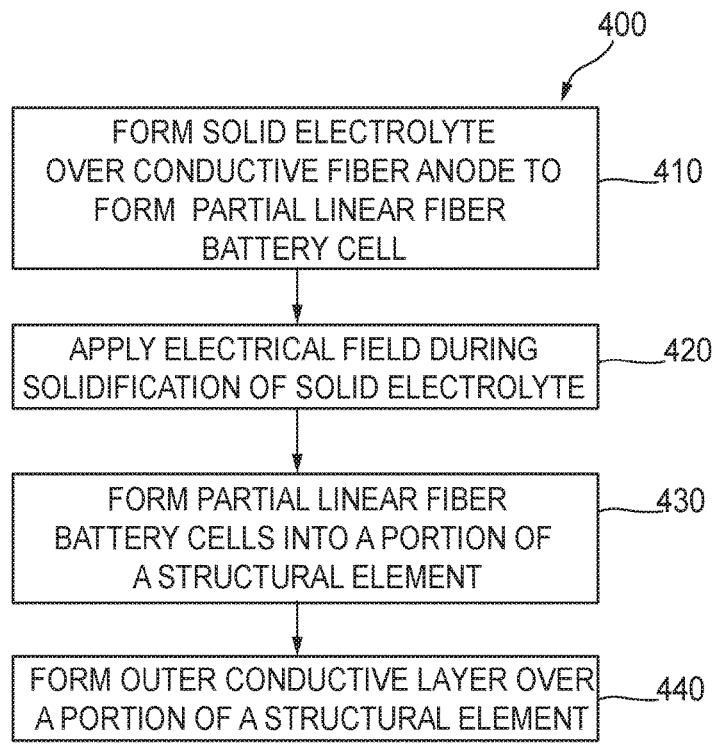
FIG. 4 is a flowchart of a method of forming a solid state fiber battery for use in a battery system according to another embodiment of the present disclosure.

Referring now to FIG. 4, a flowchart 400 is shown describing the formation of a solid state battery system according to a second method. First, at step 410, a solid electrolyte is formed over a conductive fiber anode of predetermined length appropriate for the desired application in the same manner as with respect to step 310 of the first method described above. The result of step 410 will be a partial linear fiber battery cell. Next, at optional step 420, an electrical and/or magnetic field is applied during the solidification (curing) of the electrolyte layer for the same reasons discussed above with respect to step 320 of the first method described above. At step 430, a plurality of partial fiber battery cells (i.e., conductive fiber anodes each covered with an electrolyte layer) are formed into a pattern that may form a portion of a structural element. This step is similar to step 340 above, but the partial fiber battery cells (i.e., without the outer conductive layer) are formed together instead of complete fiber battery cells as in the first method. In particular, a plurality of partial fiber battery cells are adhered into an appropriate pattern (e.g., a linear pattern with the partial fiber battery cells laid out side-by-side and stacked in layers) and a negative terminal is coupled to the anode of each of the partial fiber battery cells (i.e., to the conductive fiber anode). Finally, at step 440, an outer conductive layer is formed over the solid electrolyte layer of each of the partial fiber battery cells. As discussed above, the outer conductive layer may be comprised of an active component such as a magnesium or lithium intercalation compound mixed with a matrix material such as an epoxy resin, glass or a thermoplastic polymer. Alternatively, a Group 1 or 2 metal may be mixed with such a matrix material. The outer conductive layer may be formed in any conventional manner, e.g., casting, sintering, vacuum resin infusion, integration into prepreg resin, etc. Also, a positive terminal may be coupled to the outer conductive layer, although, in this method, the outer conductive layer is formed in a manner that may allow the outer surface itself to act as the positive terminal. Once the outer conductive layer applied (and the positive terminal added, if necessary), the solid state battery system is complete and can then be incorporated into a desired structural part during the production thereof as discussed with respect to the first method above.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A solid state battery system comprising:
    a plurality of fiber battery cells formed into a pattern, each fiber battery cell comprising:
        a fiber core comprises a carbon graphite fiber or a carbon nanotube fiber;
        an electrolyte layer formed over the fiber core; and
        an outer conductive layer formed over the electrolyte layer;
    a first terminal electrically coupled to a first fiber core of a first fiber battery cell of the plurality of fiber battery cells; and
    a second terminal electrically coupled to a first outer conductive layer of the first fiber battery cell, wherein the plurality of fiber battery cells extend through the second terminal, wherein the second terminal is electrically coupled to each outer conductive layer of the plurality of fiber battery cells, wherein each fiber core of the plurality of fiber battery cells electrically couples to first terminal, wherein a first portion of the first fiber battery cell is between the first terminal and the second terminal, and wherein the first portion does not include the first outer conductive layer.

2. The solid state battery system of claim 1, wherein the electrolyte layer comprises a solid electrolyte.

3. The solid state battery system of claim 2, wherein the solid electrolyte comprises a glassy material.

4. The solid state battery system of claim 3, wherein the glassy material comprises a lithium ion conducting material.

5. The solid state battery system of claim 2, wherein the solid electrolyte comprises a crystalline material.

6. The solid state battery system of claim 5, wherein the crystalline material comprises beta-Alumina.

7. The solid state battery system of claim 1, wherein the outer conductive layer comprises a magnesium intercalation compound.

8. The solid state battery system of claim 1, wherein the outer conductive layer comprises a lithium intercalation compound.

9. The solid state battery system of claim 1, wherein the outer conductive layer comprises a Group 1 metal compound or a Group 2 metal compound.

10. The solid state battery system of claim 1, wherein the plurality of fiber battery cells are arranged in a configuration having at least one row of fiber battery cells.

11. The solid state battery system of claim 1, wherein the plurality of fiber battery cells are formed into a mesh pattern or a weave pattern.

12. The solid state battery system of claim 1, wherein the pattern is a part of a composite part for a vehicle.

13. The solid state battery system of claim 1, wherein the pattern is a part of a wing skin for an aircraft.

14. The solid state battery system of claim 1, wherein the pattern is a part of a spar for an aircraft.

15. A method of forming a solid state battery system, the method comprising the steps of:
    forming a plurality of fiber battery cells into a pattern, wherein each fiber battery cell of the plurality of fiber battery cells is formed by:
        forming an electrolyte layer over a fiber core, the fiber core comprising a carbon-nanotube; and
        forming an outer conductive layer over the electrolyte layer;
    electrically coupling a first terminal each fiber core of the plurality of fiber battery cells; and
    electrically coupling a second terminal to each outer conductive layer of the plurality of fiber battery cells, wherein the plurality of fiber battery cells extend through the second terminal after electrically coupling the second terminal, wherein a first portion of a first battery cell of the plurality of fiber battery cells is between the first terminal and the second terminal after electrically coupling first terminal and after electrically coupling the second terminal, and wherein the first portion does not include the first outer conductive layer.

16. The method of claim 15, further comprising, after forming the electrolyte layer, applying an electrical field, a magnetic field, or a combination thereof to the electrolyte layer during a curing period.

17. An apparatus comprising:
    a composite part for a vehicle, the composite part comprising a battery system, the battery system comprising:
        a plurality of fiber battery cells formed into a pattern, each fiber battery cell comprising:
            a fiber core comprising a carbon-nanotube;
            an electrolyte layer formed over the fiber core; and
            an outer conductive layer formed over the electrolyte layer;

a first terminal electrically coupled to a first fiber core of a first fiber battery cell of the plurality of fiber battery cells; and a second terminal electrically coupled to a first outer conductive layer of the first fiber battery cell, wherein the plurality of fiber battery cells extend through the second terminal, wherein the second terminal is electrically coupled to each outer conductive layer of the plurality of fiber battery cells, wherein each fiber core of the plurality of fiber battery cells electrically couples to first terminal, wherein a first portion of the first fiber battery cell is between the first terminal and the second terminal, and wherein the first portion does not include the first outer conductive layer.

18. The apparatus of claim 17, wherein the first terminal is electrically coupled to a second fiber core of a second fiber battery cell of the plurality of fiber battery cells, and wherein the second terminal is electrically coupled to a second outer conductive layer of the second fiber battery cell.

\* \* \* \* \*